(12) United States Patent
Boutcher et al.

(10) Patent No.: US 8,488,773 B1
(45) Date of Patent: *Jul. 16, 2013

(54) SYSTEM FOR GEOGRAPHIC AGENT ROUTING

(75) Inventors: James K. Boutcher, Omaha, NE (US); Michael Todd Mateer, Omaha, NE (US); Craig A. Webster, Omaha, NE (US)

(73) Assignee: West Corporation, Omaha, NE (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/190,640

(22) Filed: Jul. 26, 2011

Related U.S. Application Data

(63) Continuation of application No. 11/421,841, filed on Jun. 2, 2006, now Pat. No. 8,009,822.

(51) Int. Cl.
*H04M 3/00* (2006.01)

(52) U.S. Cl.
USPC ............... 379/265.11; 379/265.12; 379/265.1

(58) Field of Classification Search
USPC ................ 379/265.1, 265.01, 265.11, 265.12
See application file for complete search history.

(56) References Cited

U.S. PATENT DOCUMENTS

| | | |
|---|---|---|
| 4,694,483 A | 9/1987 | Cheung |
| 5,036,535 A | 7/1991 | Gechter et al. |
| 5,619,557 A | 4/1997 | Van Berkum |
| 5,646,987 A | 7/1997 | Gerber et al. |
| 5,894,512 A | 4/1999 | Zenner |
| 5,940,497 A | 8/1999 | Miloslavsky |
| 5,953,332 A | 9/1999 | Miloslavsky |
| 6,055,307 A | 4/2000 | Behnke et al. |
| 6,222,919 B1 | 4/2001 | Hollatz et al. |
| 6,347,139 B1 | 2/2002 | Fisher et al. |
| 6,510,221 B1 | 1/2003 | Fisher et al. |
| 6,535,600 B1 | 3/2003 | Fisher et al. |
| 6,546,087 B2 | 4/2003 | Shaffer et al. |
| 6,553,114 B1 | 4/2003 | Fisher et al. |
| 6,603,854 B1 | 8/2003 | Judkins et al. |
| 6,744,878 B1 | 6/2004 | Komissarchik et al. |
| 2003/0099343 A1 | 5/2003 | Dezonno |
| 2003/0161463 A1 | 8/2003 | Galvin |
| 2004/0042612 A1 | 3/2004 | Michelson et al. |
| 2005/0195960 A1 | 9/2005 | Shaffer et al. |
| 2007/0133781 A1 | 6/2007 | Febonio et al. |

*Primary Examiner* — Rasha Al Aubaidi

(57) ABSTRACT

A call center system in which agents are geographically dispersed based on agent skill-set, agent location and caller location that results in a call being delivered to the best available agent. The call center system is comprised of a call center application module coupled to a database module with a communications network being used to couple incoming calls from customers, as well as various call center agents, to the system. The database contains a ranking of available agents, based on a dataset including information regarding skill-set, previous interaction with the customer, proximity to the customer, language capability, current availability, and so forth. The system then chooses the best available agent to service a customer call based on the agent rankings. In the case where the customer has a preference for proximity of the agent to the customer, the system adjusts the agent rankings according to the agent's distance from the customer prior to making a selection.

28 Claims, 7 Drawing Sheets

|  | Agent | Ranking | Distance | Adjustment | Final Ranking |
|---|---|---|---|---|---|
| 70 | Jim | 15 | 20 | 0.0 | 15.0 |
| 72 | Tom | 39 | 120 | 12.0 | 27.0 |
| 74 | Joe | 20 | 230 | 7.3 | 12.7 |
| 76 | Mary | 18 | 250 | 6.4 | 11.6 |
| 78 | Frank | 20 | 501 | 0.0 | 20.0 |

Congiguration

80 ---- PPF = 50%   86 ---- ARP Delta = 400
82 ---- ARP = 100-500   87 ---- Min Distance in ARP = 120
84 ---- ARR = 24   88 ---- ADS = 280

Configuration 1

Fig.3

|  | Agent | Ranking | Distance | Adjustment | Final Ranking |
|---|---|---|---|---|---|
| 100 | Jim | 15 | 20 | 0.0 | 15.0 |
| 102 | Tom | 39 | 120 | 24.0 | 15.0 |
| 104 | Joe | 20 | 230 | 14.6 | 5.4 |
| 106 | Mary | 18 | 450 | -4.3 | 22.3 |
| 108 | Frank | 20 | 501 | 0.0 | 20.0 |

Congiguration

110 ---- PPF = 100%   116 ---- ARP Delta = 400
112 ---- ARP = 100-500   117 ---- Min Distance in ARP = 120
114 ---- ARR = 24   118 ---- ADS = 280

Configuration 2

Fig.4

|     | Agent | Ranking | Distance | Adjustment | Final Ranking |
|-----|-------|---------|----------|------------|---------------|
| 130 | Jim   | 20.3    | 20       | 0.00       | 20.3          |
| 132 | Tom   | 19.5    | 120      | 0.50       | 19.0          |
| 134 | Joe   | 20.1    | 230      | 0.19       | 19.9          |
| 136 | Mary  | 19.9    | 250      | 0.14       | 19.8          |
| 138 | Frank | 20.4    | 450      | 0.00       | 20.4          |

Columns: 120, 122, 124, 126, 128

Configuration

- 140 — PPF = 50%
- 142 — ARP = 100-400
- 144 — ARR = 1
- 146 — ARP Delta = 300
- 147 — Min Distance in ARP = 120
- 148 — ADS = 180

Configuration 3

Fig. 5

|     | Agent | Ranking | Distance | Adjustment | Final Ranking |
|-----|-------|---------|----------|------------|---------------|
| 160 | Jim   | 15      | 20       | 21.6       | -6.6          |
| 162 | Tom   | 39      | 120      | 17.9       | 21.1          |
| 164 | Joe   | 20      | 230      | 13.8       | 6.2           |
| 166 | Mary  | 18      | 250      | 13.0       | 5.0           |
| 168 | Frank | 20      | 501      | 3.7        | 16.3          |

Columns: 150, 152, 154, 156, 158

Configuration

- 170 — PPF = 90%
- 172 — ARP = 0-600
- 174 — ARR = 24
- 176 — ARP Delta = 300
- 177 — Min Distance in ARP = 120
- 178 — ADS = 180

Configuration 4

Fig. 6

|   | 250 | 252 | 254 | 256 | 258 |
|---|---|---|---|---|---|
|   | Agent | Ranking | Distance | Adjustment | Final Ranking |
| 260 | Jim | 15 | 20 | 0.0 | 15.0 |
| 262 | Tom | 39 | 120 | 12.0 | 27.0 |
| 264 | Joe | 20 | 230 | 9.4 | 10.6 |
| 266 | Mary | 18 | 250 | 8.9 | 9.1 |
| 268 | Frank | 20 | 501 | 0.0 | 20.0 |

Congiguration
- 270 — PPF = 50%
- 272 — ARP = 100-500
- 274 — ARR = 24

Configuration 1

Fig. 8

|   | 280 | 282 | 284 | 286 | 288 |
|---|---|---|---|---|---|
|   | Agent | Ranking | Distance | Adjustment | Final Ranking |
| 290 | Jim | 15 | 20 | 0.0 | 15.0 |
| 292 | Tom | 39 | 120 | 24.0 | 15.0 |
| 294 | Joe | 20 | 230 | 18.7 | 1.3 |
| 296 | Mary | 18 | 450 | 8.2 | 9.8 |
| 298 | Frank | 20 | 501 | 0.0 | 20.0 |

Congiguration
- 300 — PPF = 100%
- 302 — ARP = 100-500
- 304 — ARR = 24

Configuration 2

Fig. 9

|        | Agent | Ranking | Distance | Adjustment | Final Ranking |
|--------|-------|---------|----------|------------|---------------|
| 320 -- | Jim   | 20.3    | 20       | 0.00       | 20.30         |
| 322 -- | Tom   | 19.5    | 120      | 0.45       | 19.05         |
| 324 -- | Joe   | 20.1    | 230      | 0.33       | 19.80         |
| 326 -- | Mary  | 19.9    | 250      | 0.31       | 19.60         |
| 328 -- | Frank | 20.4    | 450      | 0.00       | 20.40         |

Configuration
- 330 ---- PPF = 50%
- 332 ---- ARP = 100-400
- 334 ---- ARR = 0.9

Configuration 3

Fig. 10

|        | Agent | Ranking | Distance | Adjustment | Final Ranking |
|--------|-------|---------|----------|------------|---------------|
| 350 -- | Jim   | 15      | 20       | 21.6       | -6.6          |
| 352 -- | Tom   | 39      | 120      | 18.0       | 21.0          |
| 354 -- | Joe   | 20      | 230      | 14.0       | 6.0           |
| 356 -- | Mary  | 18      | 250      | 13.3       | 4.7           |
| 358 -- | Frank | 20      | 501      | 4.3        | 15.7          |

Configuration
- 360 ---- PPF = 90%
- 362 ---- ARP = 0-600
- 364 ---- ARR = 24

Configuration 4

Fig. 11

SYSTEM FOR GEOGRAPHIC AGENT ROUTING

CROSS-REFERENCE TO RELATED APPLICATIONS

The present patent application is a continuation of U.S. patent application Ser. No. 11/421,841, filed on Jun. 2, 2006 entitled "SYSTEM FOR GEOGRAPHIC AGENT ROUTING" and is related to U.S. patent application Ser. No. 11/421,846, filed on Jun. 2, 2006, now issued patent number 7,961,866 entitled "A METHOD AND COMPUTER READABLE MEDIUM FOR GEOGRAPHIC AGENT ROUTING" and is related to U.S. patent application Ser. No. 13/115,297, filed on May 25, 2011 entitled "METHOD AND COMPUTER READABLE MEDIUM FOR GEOGRAPHIC AGENT ROUTING", each of which are incorporated in its entirety by reference herein.

BACKGROUND OF THE INVENTION

The present invention relates to the general field of routing agents from call centers and in particular to a system for optimally routing such agents.

The present invention is a system for routing a call or other communication to a best available individual, such as a call center agent, customer service representative, and the like, who has a certain relationship with a caller, such as, for example, a physical proximity between the individual and the caller.

Currently, many businesses utilize call centers, each with multiple agents, to provide customer service. Typically, businesses employ multiple physical call centers to enable around-the-clock call handling and to utilize cheaper labor markets. Current call center applications enable call routing by a number of methods including time-of-day (TOD), agent availability, caller location and agent skill-set. In some cases, these methods can be combined to form a routing plan. There are limitations to this approach however, including the need to group agents at certain physical locations and the strict prioritization of one routing method over another. These limitations may result in a customer who is not very comfortable with his agent due to accent, lack of local knowledge, etc.

Therefore, what is needed to overcome the aforementioned limitations, is a call center system in which agents are geographically dispersed and a call routing method, based on agent skill-set, agent location and caller location, that results in call delivery to the best available agent, while allowing a certain preference towards agents who are geographically closer to the caller.

SUMMARY OF THE INVENTION

The present invention, accordingly, provides a call center system in which agents are geographically dispersed and a call routing method, based on agent skill-set, agent location and caller location, that results in call delivery to the best available agent.

In a preferred embodiment of the invention, the call center system is comprised of a call center application module coupled to a database module. A communications network is used to couple incoming calls from customers, as well as various call center agents, to the system. The communications network will accommodate both static (fixed location) and dynamic (wireless) type communications. The database contains a ranking of available agents based on a dataset including information regarding skill-set, previous interaction with the customer, proximity to the customer, language capability, current availability, and so forth. The system chooses the best available agent to service a customer call based on the ranking of all agents. In the case where the customer has a preference for proximity of the agent to the customer, the system adjusts the agent rankings according to their distance from the customer prior to making a selection.

In operation, the call center application system specifies a proximity preference factor (PPF) from 0%-100%. If the PPF is 0% then the customer does not care about the distance between the customer (caller) and the agent, then the system selects an agent solely on the initial agent ranking. However, if the customer specifies a PPF >0 with an agent range preference (ARP), then a distance adjustment is made, as follows: First, an agent ranking range (ARR) is calculated by subtracting the lowest agent ranking from the highest agent ranking. Then a distance adjustment is made for each agent within the ARP according to the formula:

$$ARR*PPF*(ARPmax+ClosestDistanceInARR-AgentDistance)/ARPmax,$$

and the final ranking is determined by subtracting the distance adjustment from the initial ranking for each agent. The agent with the lowest ranking is then assigned to service the call.

The present invention provides a fast, automated selection of the best available agent to service an incoming request based on the customer's preferences.

BRIEF DESCRIPTION OF THE DRAWINGS

The above listed and further advantages of the invention may be better understood by referring to the following description in conjunction with the accompanying drawings, in which:

FIG. 3 depicts a first configuration in accordance with a first embodiment of the present invention;

FIG. 4 depicts a second configuration in accordance with a first embodiment of the present invention;

FIG. 5 depicts a third configuration in accordance with a first embodiment of the present invention;

FIG. 6 depicts a fourth configuration in accordance with a first embodiment of the present invention.

FIG. 8 depicts a first exemplary configuration in accordance with a preferred embodiment of the present invention;

FIG. 9 depicts a second exemplary configuration in accordance with a preferred embodiment of the present invention;

FIG. 10 depicts a third exemplary configuration in accordance with a preferred embodiment of the present invention; and FIG. 11 depicts a fourth exemplary configuration in accordance with a preferred embodiment of the present invention.

DETAILED DESCRIPTION OF THE INVENTION

Figure 1:
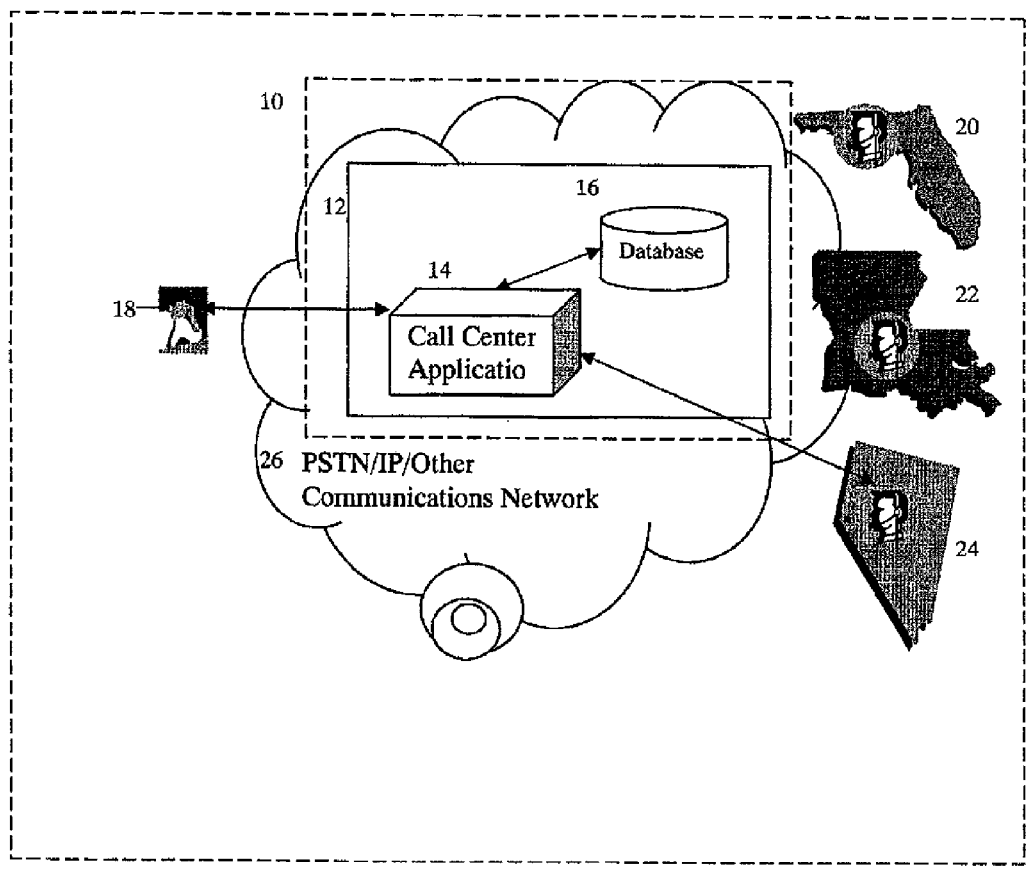
FIG. 1 depicts a call center system in accordance with a preferred embodiment of the present invention.

In the description that follows, like elements are marked throughout the specification and drawings with the same reference numerals, respectively. The drawing figures are not necessarily to scale and certain elements may be shown in generalized or schematic form in the interest of clarity and conciseness. Certain routine steps, in flow charts, normally included in the operation of the present invention have been omitted in the interest of conciseness. However, the steps which include methodology in accordance with the present invention are indicated in the charts. As is conventional, the letters Y and N designate "yes" and "no", respectively.

Referring now to FIG. 1, the overall system 10 of the present invention includes a call center system 12, which is comprised of a call center application module 14 and a database module 16 containing customer data, agent data, and the like. It should be noted that the functionality performed by the modules 14,16 can be performed by one of these modules or by another module (not shown) that may be a part of the call center system 12 or communicate with the system 12. These modules 14,16 may include software, hardware, firmware, and/or a combination of software, hardware, and/or firmware.

A customer 18, who may desire to purchase a product or a service, for example, communicates (for example, calls, emails, FAX, etc.) with a call center agent 20-24 via the call center system 12 over a communications network 26. The network 26 may be a Public Switched Telephone Network (PSTN), an Internet Protocol Network, a wired network, a wireless network, or any combination of these networks. The call center system 12 of the present invention, uses the procedure of flowchart 28, described herein, along with computer readable media to determine the best available agent from a set of geographically dispersed agents 20-24 for servicing a customer call, and routes the call accordingly to a particular agent. For purposes of this example only, the call is depicted as being routed to agent 24.

Figure 2:
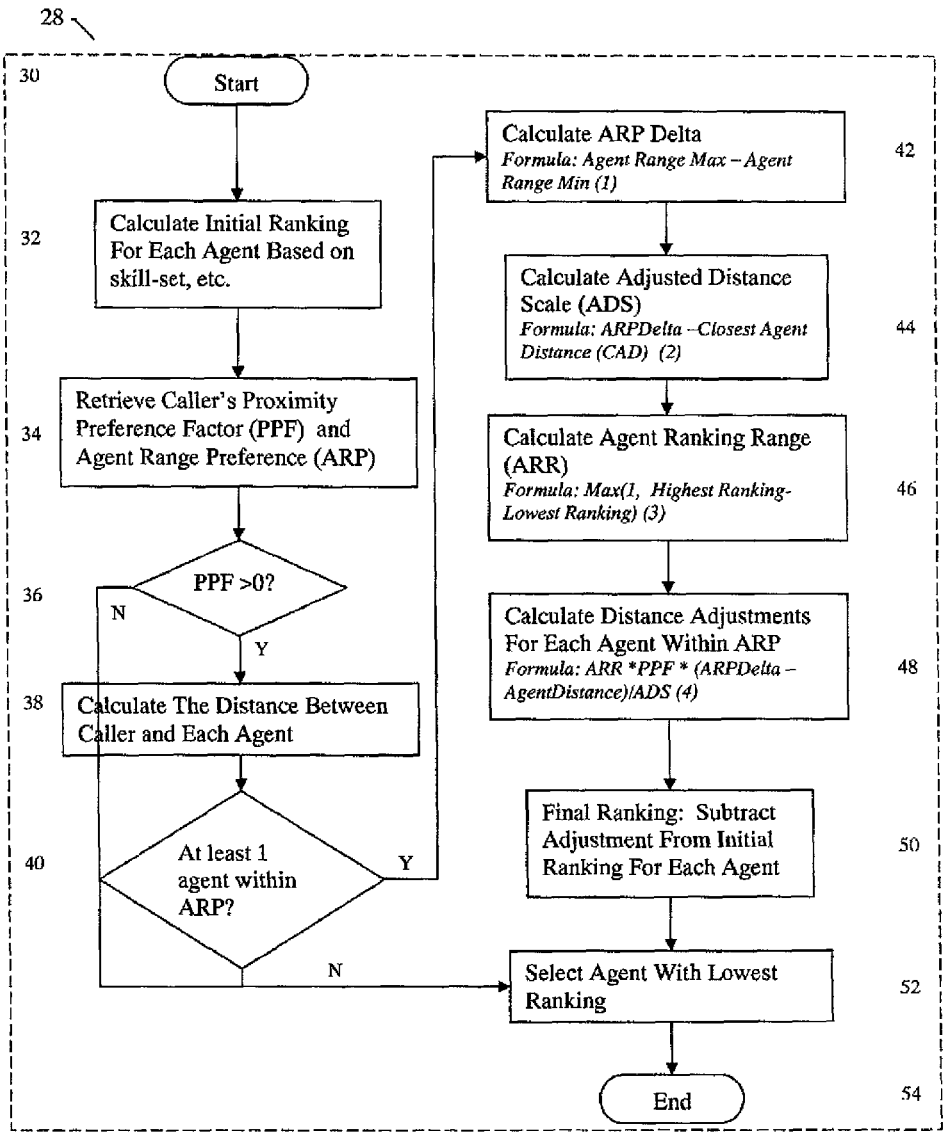
FIG. 2 depicts a flowchart for agent selection in accordance with a first embodiment of the present invention.

Referring now to FIG. 2, a first agent selection procedure of the present invention is depicted. The method begins 30 by calculating 32 an initial ranking for each agent based on skill-set and/or other attributes, which include race, sex, etc.

The method proceeds by retrieving 34 two pieces of data associated with the caller. The first is a Proximity Preference Factor (PPF). This allows the caller to weight the importance of proximity in agent selection. A PPF of 100% turns even the worst agent into the best agent if they happen to be the closest. A PPF of 50% turns the worst agent who happens to be the closest to an agent better than 50% of the available agents. A PPF of 0% effectively disables distance factors in agent selection.

The second piece of retrieved data is an Agent Range Preference (ARP). This allows a customer to specify a distance range in which proximity is going to be given consideration. The ARP consists of a minimum and a maximum distance value. The minimum can be used to filter out agents who might be calling themselves. The maximum can be used to stop giving preference to agents outside a particular range. For example, an agent 2500 miles away is probably no more preferable to an agent 2600 miles away.

Once the data has been retrieved, a decision point 36 is reached. If the PPF=0, then agent distance is not a factor for this caller. Given this, the method proceeds to agent selection 52 based on the initial agent ranking.

However, if the PPF >0, then distance is a factor for this caller. Given this, a distance between the caller and each agent is calculated 38. This can be done with simple calculations that take advantage of static (address, NPA-NXX, zip code, etc.) and/or dynamic (cell site, GPS coordinates, etc.) data associated with the caller and the available agents.

Once complete, the method determines 40 if there is at least one agent whose distance falls within the ARP. If not, then the distance of the available agents is still not a factor, so the method proceeds to agent selection 52.

If there is at least one agent that falls within the ARP, then the method proceeds to calculate an ARP Delta 42. The ARP delta is the difference between the maximum and the minimum ARP distance values as shown by the formula below:

$$\text{ARP Delta} = \text{ARP Maximum} - \text{ARP Minimum} \tag{1}$$

The ARP Delta is then used to calculate 44 an Adjusted Distance Scale (ADS), which is determined by subtracting the closest agent distance (CAD) within the ARP range from the ARP Delta as shown by the formula below:

$$\text{ADS} = \text{ARP Delta} - \text{Closest Agent Distance} \tag{2}$$

The method continues by calculating 46 an Agent Ranking Range (ARR), which is determined by subtracting the lowest agent ranking from the highest agent ranking or setting the value of equal to 1 if the result of the subtraction is zero, as derived by the following formula:

$$\text{ARR} = \text{Maximum}(1, \text{High Agent Ranking} - \text{Lowest Agent Ranking}) \tag{3}$$

Once the ARP Delta, ADS and ARR have been calculated (42-46), a ranking adjustment is calculated 48 for each agent whose distance falls within the ARP. The adjustment is calculated using the formula:

$$\text{Adjustment} = \text{ARR} * \text{PPF} * (\text{ARPDelta} - \text{AgentDistance}) / \text{ADS} \tag{4}$$

This formula uses the Agent Ranking Range (ARR) and the callers Proximity Preference Factor (PPF) to scale the adjustment. The closest agent will receive the largest adjustment. The furthest agent will receive the smallest adjustment.

Once the adjustments have been calculated, the method proceeds to calculate 50 the final ranking of all the agents. This calculation is performed by subtracting any adjustment from the initial ranking determined previously 32.

With the final rankings calculated, the selection ends 54 by selecting 52 the lowest ranking and therefore, the best agent.

In order to understand the benefits of the method, several applications of the invention in various caller/agent configurations will now be described. Referring now to FIG. 3, in a first exemplary configuration, the initial ranking 62 of the various agents 70-78 listed in the agent column 60 is determined as listed. Once determined, the PPF 80 and the ARP 82 submitted by the call center application are retrieved. In this case the PPF is 50% and the ARP is 100 to 500. Since the callers PPF (50%) is greater than zero, the distance 64 between the caller and each agent 70-78 is calculated.

Three agents, 72-76 are within the ARP range, so their rankings must be adjusted. To do this, the ARP Delta 86 is calculated first. As shown by the formula 1, the ARP delta is calculated by subtracting the agent range minimum from the agent range maximum. In this case, given that the maximum is 500 and the minimum is 100 (FIG. 3-82), the ARP Delta 86 is 400. The method then proceeds to calculate the ADS 88, which is calculated by formula 2. In this case, the closest agent within the range is Tom 87 at 120 miles, so the ADS 88=400−120=280.

The procedure then proceeds using formula 4 to calculate the distance adjustment 66 for each agent 72-76 within the ARP 82 range. Note that agents 70, 78 outside the ARP range receive a 0 adjustment. The adjustment values 66 are then calculated according to formula 4. Tom 72 receives the biggest adjustment, 12, as he is closest to the caller. The figure is arrived at by the following calculation of equation 4:24*0.50* (400−120)/280=12. The ARR is 24 and 0.50 is the callers' 50% PPF. The remaining within-range agent adjustments are calculated similarly, with Joe 74 receiving an adjustment of 7.3 and Mary 76 receiving an adjustment of 6.4.

The final rankings 68 for the agents are then calculated by subtracting the adjustment value 66 from the initial ranking 62. The result in this exemplary configuration is that Mary 76 has the lowest final ranking, 11.6, and therefore is chosen as the best agent. Note that Mary is not the closest agent within the agent range preference, but the adjustment to her already low initial ranking of 18 moved her ahead of Jim, the agent with the best initial ranking.

Referring now to FIG. 4, in a second exemplary configuration, the caller's PPF 110 is now set to 100, indicating that proximity is of utmost importance to the caller. In this case, since the PPF=100, instead of 50, the PPF factor in formula 4 equals 1, instead of 0.5. Here, the ARP 112 is 100-500 so that the ARP delta 116 is 400, minimum distance within the ARP 117 is 120, the ARR 114 is 24, and the ADS 118 is 280. Again, Jim 100 and Frank 108 are outside the ARP 112 range and receive zero adjustments 96. Adjustments 96 of 24 for Tom 102, 14.6 for Joe 104, and −4.3 for Mary 106 are calculated. The resulting final rankings 98 depict that Joe has the lowest ranking and is therefore chosen as the best agent. Although Mary has a better initial ranking than Joe, Joe is closer than Mary and that is more important to the caller in this exemplary configuration.

Referring now to FIG. 5, in a third exemplary configuration, the caller's PPF 140 is again set to 50% and the ARP 142 is 100-400. However, the ranking 122 for the Agents 120 shows Jim 130 at 20.3, Tom 132 at 19.5, Joe 134 at 20.1, Mary 136 at 19.9, and Frank 138 at 20.4. Since the distances 124 for Jim 130 and Frank 138 are 20 and 450, respectively, these are outside the ARP 142 range of >100 and <400, so the adjustment for each of these two agents is set at zero. Furthermore, the ARP delta 146 is 300, the minimum distance within ARP 147 is 120, and ADS 148 is 180. In this case then, using formula 3 (ARR=Maximum (1, High Agent Ranking−Lowest Agent Ranking), the ARR 144 is calculated to be 1 as a result of the agent rankings 122 being tightly packed. This results in an adjustment 126 of 0.50 for Tom 132, 0.19 for Joe 134, and 0.14 for Mary 136. The resulting final rankings 128 depict that Tom has the lowest ranking and is therefore chosen as the best agent. In this example, Tom had both the best initial ranking and the best adjusted ranking.

Referring now to FIG. 6, a fourth exemplary configuration is shown, which has the same initial ranking 122 and distance 124 for the agents 130-138 as for the first exemplary configuration discussed in FIG. 3. However, here the caller's PPF 170 is now set to 90%, indicating that proximity is of fairly high importance to the caller, the ARP 172 is 0-600, the ARR 174 is 24, the ARP delta 176 is 600, the minimum distance in ARP 177 is 20, and the ADS 178 is 580. Although this example is much like the first exemplary configuration, now all five agents 160-168 are within the ARP 172 range and therefore need to be adjusted. In this case, since the PPF=90%, instead of 50%, the PPF factor in formula 4 equals 0.9, instead of 0.5. This results in adjustments 156 of 21.6 for Jim 160, 17.9 for Tom 162, 13.8 for Joe 164, 13.0 for Mary 166, and 3.7 for Frank 168. The resulting final rankings 158 depict that Jim 160 with and a final ranking 158 of −6.6 has the lowest ranking after adjustment and is therefore chosen as the best agent.

Figure 7:
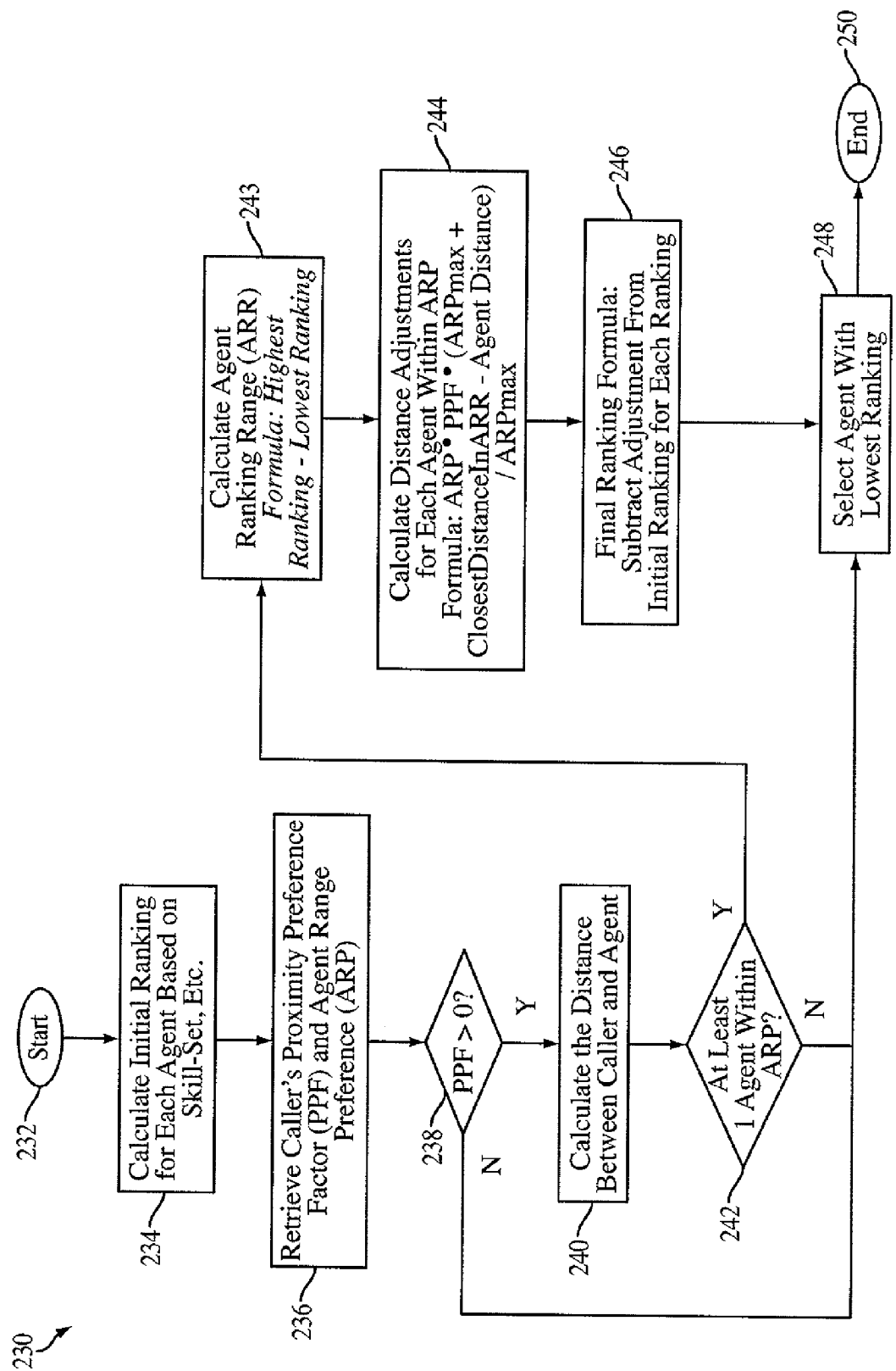
FIG. 7 depicts a flowchart for agent selection in accordance with a preferred embodiment of the present invention.

FIG. 7 shows a simplified preferred embodiment of the agent selection procedure of the present invention. The method uses the procedure illustrated in flowchart 230. Here, the method begins 232 by calculating 234 an initial ranking for each agent based on skill-set and/or other attributes, which include race, sex, etc.

The method proceeds by retrieving 236 two pieces of data associated with the caller. The first is a Proximity Preference Factor (PPF). This allows the caller to weight the importance of proximity in agent selection. A PPF of 100% turns even the worst agent into the best agent if they happen to be the closest. A PPF of 50% turns the worst agent who happens to be the closest to an agent better than 50% of the available agents. A PPF of 0% effectively disables distance factors in agent selection.

The second piece of retrieved data is an Agent Range Preference (ARP). This allows a customer to specify a distance range in which proximity is going to be given consideration. The ARP consists of a minimum and a maximum distance value. The minimum can be used to filter out agents who might be calling themselves. The maximum can be used to stop giving preference to agents outside a particular range. For example, an agent 2500 miles away is probably no more preferable to an agent 2600 miles away.

Once the data has been retrieved, a decision point 238 is reached. If the PPF=0, then agent distance is not a factor for this caller. Given this, the method proceeds to agent selection 248 based on the initial agent ranking.

However, if the PPF >0, then distance is a factor for this caller. Given this, a distance between the caller and each agent is calculated 240. This can be done with simple calculations that take advantage of static (address, NPA-NXX, zip code, etc.) and/or dynamic (cell site, GPS coordinates, etc.) data associated with the caller and the available agents.

Once complete, the method determines 242 if there is at least one agent whose distance falls within the ARP. If not, then the distance of the available agents is still not a factor, so the method proceeds to agent selection 248.

However, if at least one agent falls within the ARP, then the method proceeds to calculate 243 an Agent Ranking Range using the formula;

$$ARR = \text{Highest Agent Ranking} - \text{Lowest Agent Ranking} \quad (5)$$

Next, this Agent Ranking Range is used to calculate a distance adjustment 244 for each agent within the ARP, using the formula:

$$\text{Adjustment} = ARR*PPF*(ARP_{max} + \text{ClosestDistance-InARR} - \text{AgentDistance})/ARP_{max}, \quad (6).$$

This formula uses the Agent Ranking Range (ARR) and the callers Proximity Preference Factor (PPF) to scale the adjustment. The closest agent will receive the largest adjustment. The furthest agent will receive the smallest adjustment.

Once the adjustments have been calculated, the method proceeds to calculate 246 the final ranking of all the agents. This calculation is performed by subtracting each adjustment from the initial ranking determined previously 234.

With the final rankings calculated, the selection ends 250 by selecting 248 the lowest ranking and therefore, the best agent.

Again, in order to understand the benefits of the method for this preferred embodiment of the invention, several applications of the invention in various caller/agent configurations will now be described. Referring now to FIG. 8, in a first exemplary configuration, the initial ranking 252 of the various agents 260-268 listed in the agent column 250 is determined as listed. Once determined, the PPF 270 and the ARP 272 submitted by the call center application are retrieved. In this case the PPF is 50% and the ARP is 100 to 500. Since the callers PPF (50%) is greater than zero, the distance 254 between the caller and each agent 260-268 is calculated. Finally, the ARR 274 is calculated as the Highest Ranked Agent−Lowest Ranked Agent. In this case, since Tom 262 is the highest ranked agent with a ranking of 39 and Jim 260 is the lowest ranked agent with a ranking of 15, the ARR=39−15=24 (5).

Since three agents, 262-266 are within the ARP range, their rankings must be adjusted using formula (6), as follows to calculate the distance adjustment 256 for each agent 262-266 within the ARP 272 range. Note that agents 260, 268 outside the ARP range receive a 0 adjustment. The adjustment values 256 are then calculated according to formula (6). Tom 262 receives the biggest adjustment, 12, as he is closest to the caller. This figure is arrived at by the following calculation of formula (6): Adjustment=24*0.50*(500+120−120)/500=12. The ARR 274 is 24 and the PPF 270 is 0.50 or 50%. The remaining within-range agent adjustments are calculated similarly, with Joe 264 receiving an adjustment of 9.4 and Mary 266 receiving an adjustment of 8.9.

The final rankings 258 for the agents are then calculated by subtracting the adjustment 256 values from the initial ranking 252 values. The resulting final rankings 27.0 for Tom 262, 10.6 for Joe 264, and 9.1 for Mary 266 depict that Mary 266 has the lowest final ranking of 9.1 and is therefore chosen as the best agent.

Referring now to FIG. 9, in a second exemplary configuration, the caller's PPF 300 is now set to 100%, indicating that proximity is of utmost importance to the caller. In this case, since the PPF=100%, instead of 50%, the PPF factor in formula (6) equals 1.0, instead of 0.5. Here, the ARP 302 is 100-500 and the ARR 304 is 24. Again, Jim 290 and Frank 298 are outside the ARP 310 range and receive zero adjustments 286. Adjustments 286 of 24 for Tom 292, 18.7 for Joe 294, and 8.2 for Mary 296 are calculated using equation (6). The resulting final rankings 288 of 15.0 for Tom 292, 1.3 for Joe 294, and 9.8 for Mary 296 depict that Joe 294 has the lowest final ranking of 1.3 and is therefore chosen as the best agent. Although Mary 296 has a better initial ranking than Joe 294, Joe is closer than Mary and that is more important to the caller in this exemplary configuration.

Referring now to FIG. 10, in a third exemplary configuration, the caller's PPF 330 is again set to 50% and the ARP 332 is 100-400. However, the initial ranking 312 for the Agents 310 shows Jim 320 at 20.3, Tom 322 at 19.5, Joe 324 at 20.1, Mary 326 at 19.9, and Frank 328 at 20.4. The ARR 334 is 0.9 determined as the difference between the highest and lowest ranking of 20.4 and 19.5. Since the distances 314 for Jim 320 and Frank 328 are 20 and 450, respectively, and are outside the ARP 332 range of 100 and 400, the adjustment for each of these two agents is set to zero. Equation (6) is then used to calculate the adjustments for the remaining three agents, which results in an adjustment 316 of 0.45 for Tom 322, 0.33 for Joe 324, and 0.31 for Mary 326. The resulting final rankings 318 of 19.05 for Tom 322, 19.8 for Joe 324, and 19.6 for Mary 326 depict that Tom 322 has the lowest ranking and is therefore chosen as the best agent. In this example, Tom had both the best initial ranking and the best adjusted ranking.

Referring now to FIG. 11, a fourth exemplary configuration is shown, which has the same initial ranking 342 and distance 344 for the agents 350-358 as for the first exemplary configuration discussed in FIG. 8. However, here the caller's PPF 360 is now set to 90%, indicating that proximity is of fairly high importance to the caller, the ARP 362 is 0-600, and the ARR 364 is 24. Although this example is much like the first exemplary configuration of FIG. 9, now all five agents 350-358 are within the ARP 362 range and therefore need to be adjusted. In this case, since the PPF=90%, instead of 50%, the PPF factor in formula (6) is set to 0.9. This results in adjustments 346 of 21.6 for Jim 350, 18.0 for Tom 352, 14.0 for Joe 354, 13.3 for Mary 356, and 4.3 for Frank 358. The resulting final rankings 348 of −6.60 for Jim 350, 21.0 for Tom 352, 6.0 for Joe 354, 4.7 for Mary 356, and 15.7 for Frank 358 depict that Jim 350 with and a final ranking 348 of −6.6 has the lowest ranking after adjustment and is therefore chosen as the best agent.

Although embodiments of a system for geographic agent routing have been described in detail herein, it will be appreciated that the present invention may provide applicable inventive concepts that can be embodied in a wide variety of specific contexts. For example, while the preferred embodiment of the invention has principally referenced a system for optimally routing agents it should be understood that the system may also be utilized for alternative applications, such as selecting particular computers, security systems, imaging systems, and the like. Also, a lesser or greater number of modules or components may be utilized to make the selection of the best available agent. The specific embodiments discussed herein are merely illustrative of specific ways to make and use the invention, and do not delimit the scope of the invention. Those skilled in the art will recognize that various substitutions and modifications and a lesser or greater number of modules or components may be utilized in the invention without departing from the scope and spirit of the appended claims.

What is claimed is:

1. A system, comprising:
   a call center application module;
   a database module coupled to said call center application module; and
   at least one call center agent communication device coupled to said call center application module, the at least one call center agent communication device being assigned a call based on
   a specified distance range being measured between the caller and an agent prior to the call being assigned.

2. The system of claim 1, wherein a communications network couples said call center application module with incoming calls and existing call center agents.

3. The system of claim 2, wherein a plurality of caller communication devices are coupled through said communications network to said call center application module.

4. The system of claim 3, wherein said caller communication devices provide capability for static communications via at least one of: a landline phone call, an e-mail, a fax, and Internet.

5. The system of claim 3, wherein said caller communication devices further provide capability for communications via at least one of: a wireless phone, a wireless intercom, and a wireless Internet.

6. The system of claim 2, wherein said communications network includes at least one of: a public switched telephone network, an Internet protocol network, a wired network, a wireless network, and various combinations thereof.

7. The system of claim 1, wherein said call center application module contains a combination of components from the component group consisting of: software, hardware, firmware, and combinations thereof.

8. The system of claim 1, wherein a distance between a caller and various locations of agents utilizing said call center agent communication device is determined using at least one of: an address, a NPA-NXX, and a Zip Code.

9. The system of claim 1, wherein a distance between a caller and various agent locations is determined using at least one of a following locality designator: cell site locations and GPS coordinates.

10. The system of claim 1, wherein said database module contains an initial agent ranking based on a dataset including information of at least one from the group of: skill-set, previous interaction with a caller, language capability, race, sex, minimum distance to a caller, maximum distance to a caller and current availability.

11. The system of claim 10, wherein an agent is assigned to service a caller based on said initial agent ranking when said caller specifies no agent range preference indicating distance between said caller and said agent.

12. The system of claim 11, wherein an agent distance adjustment is made relative to a closest agent distance prior to assigning an agent to service a caller when said caller specifies an agent range preference.

13. The system of claim 12, wherein an agent range preference delta is calculated by
subtracting said minimum distance between a caller and said agent from said maximum distance between a caller and said agent.

14. The system of claim 13, wherein an adjusted distance scale is calculated by subtracting said minimum distance between a caller and said agent from said agent range preference delta.

15. The system of claim 14, wherein an agent ranking range parameter is calculated by subtracting said initial agent ranking of a lowest value from said initial agent ranking of a highest value.

16. The system of claim 15, wherein a distance adjustment for each said agent within said agent range preference is made by multiplying said agent range preference times a proximity preference factor times a difference between said agent range preference delta and an agent distance to said caller and dividing by said calculated adjusted distance scale, wherein the proximity preference factor indicates the distance between the caller and the agent.

17. The system of claim 16, wherein a final ranking is calculated by subtracting said distance adjustment from said initial ranking for each said agent.

18. The system of claim 15, wherein a distance adjustment for each said agent within said agent range preference is made by multiplying said agent range preference times said proximity preference factor times a term comprised of ARPmax plus a closest distanceARP minus an agent distance and dividing the result by said ARPmax.

19. The system of claim 18, wherein a final ranking is calculated by subtracting said distance adjustment from said initial ranking for each said agent.

20. A system, comprising:
a call center application module;
a database memory module coupled to said call center application module;
at least one call center agent communication device coupled to said call center application module, the at least one call center agent communication device being assigned a call based on
a specified distance range being measured between the caller and an agent prior to the call being assigned;
wherein the at least one call center agent communications device is assigned a call based on an initial ranking of all available agents performed by the call center application module, and based on
a specified distance range being measured between the caller and an agent prior to the call being assigned.

21. The system of claim 20, wherein a communications network further couples said call center application module with incoming calls.

22. The system of claim 20, wherein an agent distance adjustment is made relative to a closest agent distance prior to assigning an agent to service the caller when the caller specifies an agent range preference.

23. A module, comprising:
at least one processor;
at least one memory communicably coupled to the at least one processor;
wherein the at least one processor:
calculates an initial ranking for at least one available agent;
retrieves a proximity preference factor and an agent range preference data for an incoming call;
selects an agent with a lowest said initial ranking;
calculates a distance between the caller and the at least one agent; and
calculates a final adjusted agent ranking, wherein a best of the at least one agent to service the caller is an agent with a lowest said final adjusted agent ranking.

24. The module of claim 23, wherein the processor calculates at least one of:
an agent range preference delta between an agent with maximum range and an agent with minimum range;
an adjusted distance scale;
an agent ranking range; and
a distance adjustments for each said agent within said agent range preference.

25. The module of claim 24, wherein said distance adjustment calculation for each said agent within said agent range preference is calculated by at least one of:
multiplying said agent range preference times said proximity preference factor times a difference between said agent range preference delta and an agent distance to said caller and dividing by said calculated adjusted distance scale; and
multiplying said agent range preference times said proximity preference factor times a term comprised of ARPmax plus a closest distance ARP minus an agent distance and dividing the result by said ARPmax.

26. The module of claim 23, wherein an agent is assigned to service a call based on an initial ranking of available agents when said caller specifies no agent range preference data.

27. The module of claim 23, wherein adjusted agent ranges are calculated relative to a closest agent distance when said incoming caller specifies an agent range preference.

28. The module of claim 27, wherein said agent is selected based on said adjusted agent ranges when said caller specifies an agent range preference.

* * * * *